United States Patent
Hsu et al.

(10) Patent No.: US 7,382,514 B2
(45) Date of Patent: Jun. 3, 2008

(54) CORE-SHELL PARTICLES FOR ELECTROPHORETIC DISPLAY

(75) Inventors: Wan Peter Hsu, Fremont, CA (US); Huiyong Paul Chen, San Jose, CA (US); Denis Leroux, Charlestown, MA (US); Zarng-Arh George Wu, Sunnyvale, CA (US); Rong-Chang Liang, Cupertino, CA (US)

(73) Assignee: Sipix Imaging, Inc., Fremont, CA (US)

(*) Notice: Subject to any disclaimer, the term of this patent is extended or adjusted under 35 U.S.C. 154(b) by 239 days.

(21) Appl. No.: 11/288,973

(22) Filed: Nov. 28, 2005

(65) Prior Publication Data

US 2006/0132896 A1 Jun. 22, 2006

Related U.S. Application Data

(63) Continuation-in-part of application No. 10/364,270, filed on Feb. 10, 2003, now abandoned.

(60) Provisional application No. 60/356,226, filed on Feb. 11, 2002.

(51) Int. Cl.
*G02B 26/00* (2006.01)

(52) U.S. Cl. .................. 359/290; 430/32; 345/107; 399/131; 204/600

(58) Field of Classification Search .............. 359/290, 359/296; 347/111; 430/32; 345/107; 399/131; 204/600
See application file for complete search history.

(56) References Cited

U.S. PATENT DOCUMENTS

| | | | |
|---|---|---|---|
| 3,281,426 A | 10/1966 | Van Dyke Tiers | |
| 3,668,106 A | 6/1972 | Ota | |
| 3,960,814 A | 6/1976 | Cochoy | |
| 4,071,430 A | 1/1978 | Liebert | |
| 4,085,137 A | 4/1978 | Mitsch et al. | |
| 4,093,534 A | 6/1978 | Carter et al. | |
| 4,285,801 A | 8/1981 | Chiang | |
| 4,298,448 A | 11/1981 | Muller et al. | |
| 4,620,916 A | 11/1986 | Zwemer et al. | |
| 4,680,103 A | 7/1987 | Solomon I. et al. | |
| 4,891,245 A | 1/1990 | Micale | |
| 4,999,333 A | 3/1991 | Usami | |
| 5,204,185 A | 4/1993 | Seitz | |
| 5,248,556 A | 9/1993 | Matijevic et al. | |
| 5,318,628 A * | 6/1994 | Matijevic et al. | 106/499 |
| 5,380,362 A | 1/1995 | Schubert | |
| 5,403,518 A | 4/1995 | Schubert | |
| 5,443,908 A | 8/1995 | Matsushita et al. | |
| 5,573,711 A | 11/1996 | Hou et al. | |
| 5,783,614 A | 7/1998 | Chen et al. | |
| 5,914,806 A | 6/1999 | Gordon II et al. | |
| 5,930,026 A | 7/1999 | Jacobson et al. | |
| 5,961,804 A * | 10/1999 | Jacobson et al. | 204/606 |
| 6,017,584 A | 1/2000 | Albert et al. | |
| 6,132,873 A | 10/2000 | Dietz et al. | |
| 6,162,521 A | 12/2000 | Falcone | |
| 6,184,856 B1 | 2/2001 | Gordon, II et al. | |
| 6,187,954 B1 | 2/2001 | Falcone | |
| 6,261,483 B1 | 7/2001 | Frank et al. | |
| 6,262,833 B1 | 7/2001 | Loxley et al. | |
| 6,400,492 B1 * | 6/2002 | Morita et al. | 359/296 |
| 6,672,921 B1 | 1/2004 | Liang et al. | |
| 6,795,138 B2 | 9/2004 | Liang et al. | |
| 6,833,401 B1 * | 12/2004 | Xue et al. | 524/401 |
| 6,930,818 B1 | 8/2005 | Liang et al. | |
| 6,933,098 B2 | 8/2005 | Chan-Park et al. | |
| 2003/0169227 A1 | 9/2003 | Chen et al. | |
| 2003/0207963 A1 | 11/2003 | Chen et al. | |

FOREIGN PATENT DOCUMENTS

| | | |
|---|---|---|
| EP | 0 336 666 | 10/1989 |
| EP | 0 562 344 | 9/1993 |
| EP | 0 708 154 | 4/1996 |
| WO | WO 82/02961 | 9/1982 |
| WO | WO 95/33085 | 12/1995 |
| WO | WO 99/10767 | 3/1999 |
| WO | WO 01/67170 | 9/2001 |
| WO | WO 02/01281 | 1/2002 |
| WO | WO 02/056097 | 7/2002 |
| WO | WO 02/65215 | 8/2002 |

OTHER PUBLICATIONS

Allen, K. (Oct. 2003). Electrophoretics Fulfilled. *Emerging Displays Review: Emerging Display Technologies, Monthly Report*—Oct. 9-14, 2003.

Bardsley, J.N. & Pinnel, M.R. (Nov. 2004) Microcup™ Electrophoretic Displays. *USDC Flexible Display Report*, 3.1.2. pp. 3-12-3-16.

(Continued)

*Primary Examiner*—Hung Dang
*Assistant Examiner*—Joseph Martinez
(74) *Attorney, Agent, or Firm*—Howrey LLP

(57) ABSTRACT

The invention relates to electrophoretic displays comprising core-shell pigment particles having a core of low specific gravity and low refractive index and a shell of high refractive index.

39 Claims, No Drawings

OTHER PUBLICATIONS

Caporiccio et al., "Low Temperature Elastomeric Polyamides Containing Perfluorinated Polyether Building Blocks", *Makromol. Chem.* 184, pp. 935-947 (1983).

Chaug, Y.S., Haubrich, J.E., Sereda, M. and Liang, R.C. (Apr. 2004). Roll-to-Roll Processes for the Manufacturing of Patterned Conductive Electrodes of Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Dec. 1, 2005) *Microcupt® Electronic Paper Device and Application.* Presentation conducted at USDC 4th Annual Flexible Display Conference 2005.

Ho, C., & Liang, R.C. (Dec. 2003). *Microcup (R) Electronic Paper by Roll-to-Roll Manufacturing Processes.* Presentation conducted at FEG, Nei-Li, Taiwan.

Dalisa, A.L., "Electrophoretic Display Technology", *IEEE Trans. Electr. Devices*, pp. 827-834 (1997).

Fowkes, et al., "Mechanism of Electric Charging of Particles in Nonaqueous Liquids", *Colloids and Surfaces in Reprographic Technology, an ACS Symposium Series 200*, pp. 307-324 (1982).

Gutcho, M., "Microcapsules and Microencapsulation Techniques", *Chemical Technology Review*, No. 73, Noyes Data Corp. (1976).

Hopper and Novotny, "An Electrophoretic Display, Its Properties, Model and Addressing", *IEEE Trans. Electr. Devices*, ED-26, No. 8, pp. 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Kang, H. et al., "Preparation of Fe-Free Alumina Powder from Kaolin" *Journal of Materials Science Letters*, vol. 14, pp. 425-427 (1995).

Komarneni, S. et al, "Microwave-Hydrothermal Syntheses of Ceramic Powders", *Mat. Res. Bull.*, vol. 27, pp. 1393-1405 (1992).

Kondo, A., *Microcapsule Processing and Technology*, Marcel Dekker (1979).

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process.* Presentation at the Flexible Displays & Electronics 2004 of Intertech, San Fransisco, California, USA.

Liang, R.C. (Oct. 2004) *Flexible and Roll-able Display/Electronic Paper—A Technology Overview.* Paper presented at the METS 2004 Conference in Taipie, Taiwan.

Liang, R.C., (Feb. 2005) *Flexible and Roll-able Displays/Electronic Paper—A Brief Technology Overview*, Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*, Paper Presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process.* Paper presented at the IDMC, Taipei, Taiwan.

Malik et al., "Synthesis of Fluorinated Diisocyanates", *J. Org. Chem.* 56, pp. 3043-3044 (1991).

Murau et al., "The Understanding and Elimination of Some Suspension Instabilities in an Electrophoretic Display", *J. Appl. Phys.* 49(9), pp. 4820-4829 (1978).

Nikkei Microdevices. (Dec. 2002) Newly-Developed Color Electronic Paper Promises—Unbeatable Production Efficiency. *Nikkei Microdevices*, 3. (in Japanese, with English translation).

Park, S., et al., "Characterization of $ZrO_2$-$Al_2O_3$ Composites Sintered in a 2.45 GHz Electromagnetic Field", *Journal of Materials Science*, vol. 26, pp. 6309-6313 (1991).

Schmidt, et al., "Chapter 6 Liquid Toner Technology", Handbook of Imaging Materials, pp. 227-252, Marcel Dekker (1991).

Singh and Copley. Ed. (1994) *Novel Tech. Synth. Process, Adv. Mater. Proc. Symp.*, 103-117.

Stober, et al., "Controlled Growth of Monodisperse Silica Spheres in the Micron Size Ragne", *Journal of Colloid and Interface Science*, vol. 26, pp. 62-69 (1968).

Vandegaer, J.E. editor, *Microencapsulation; Processes and Applications*, Plenum Press (1974).

Wang, et al., (Feb. 2006) *Inkjet Fabrication of Multi-Color Microcup® Electrophorectic Display.* the Flexible Microelectronics & Displays Conference of U.S. Display Consortium, Feb. 9, 2006.

Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper.* Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes.* Presentation conducted at the Advisory Board Meeting, Bowling Green State University, Ohio, USA.

Zang, H.M.Hou, Jack, (Feb. 2005) *Flexible Microcup® EPD by RTR Process.* Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS& T Electronic Imaging*, SPIE vol. 5289, 102-108.

Zang, H.M., & Liang, R.C. (2003) Microcup Electronic Paper by Roll-to-Roll Manufacturing Processes. *The Spectrum*, 16(2), 16-21.

\* cited by examiner

CORE-SHELL PARTICLES FOR ELECTROPHORETIC DISPLAY

This application is a continuation-in-part of U.S. application Ser. No. 10/364,270, filed Feb. 10, 2003 now abandoned; which claims the benefit of Provisional Application No. 60/356,226, filed Feb. 11, 2002; the content of both are incorporated herein by reference in their entirety.

BACKGROUND OF THE INVENTION

Electrophoretic displays (also known as EPDs, electrophoretic image displays or EPIDs or EPID cells) are non-emissive devices based on the electrophoresis phenomenon influencing charged pigment particles suspended in a colored dielectric solvent. This type of display was first proposed in 1969. An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively, are needed to drive the displays. In contrast, an array of thin film transistors (TFTs) on the bottom plate and a common, non-patterned transparent conductor plate on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

To view a reflective EPD, an external light source is needed. For applications to be viewed in the dark, either a backlight system or a front pilot light system may be used. A transflective EPD equipped with a backlight system is typically preferred over a reflective EPD with a front pilot light because of cosmetic and uniformity reasons. However, the presence of light scattering particles in typical EPD cells greatly reduces the efficiency of the backlight system. A high contrast ratio in both bright and dark environments, therefore, is difficult to achieve for traditional EPDs.

A transmissive EPD is disclosed in U.S. Pat. No. 6,184,856 in which a backlight, color filters and substrates with two transparent electrodes are used. The electrophoretic cells serve as a light valve. In the collected state, the particles are positioned to minimize the coverage of the horizontal area of the cell and allow the backlight to pass through the cell. In the distributed state, the particles are positioned to cover the horizontal area of the pixel and scatter or absorb the backlight. However, the backlight and color filter used in this device consume a great deal of power and therefore are not desirable for hand-held devices such as PDAs (personal digital assistants) and e-books.

EPDs of different pixel or cell structures have been reported previously, for example, the partition-type EPD (M. A. Hopper and V. Novotny, *IEEE Trans. Electr. Dev.*, 26(8):1148-1152 (1979)) and the microencapsulated EPD (U.S. Pat. Nos. 5,961,804 and 5,930,026). However, both types have their own problems as noted below.

In the partition-type EPD, there are partitions between the two electrodes for dividing the space into smaller cells in order to prevent undesired movement of the particles such as sedimentation. However, difficulties are encountered in the formation of the partitions, the process of filling the display with an electrophoretic fluid, enclosing the fluid in the display and keeping the fluids of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution, and to achieve a useful contrast ratio, their mean particle size is relatively large (50-150 microns). The large microcapsule size results in poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in an aqueous solution imposes a limitation on the type of charge-controlling agents that can be used. Other drawbacks associated with the microcapsules system include poor resolution and poor addressability for color applications.

An improved EPD technology was disclosed in U.S. Pat. No. 6,930,818 (corresponding to WO 01/67170), U.S. Pat. No. 6,672,921 (corresponding to WO02/01281) and U.S. Pat. No. 6,933,098 (corresponding to WO02/65215); all of which are incorporated herein by reference. The improved EPD comprises isolated cells formed from microcups of well-defined shape, size and aspect ratio and filled with charged pigment particles dispersed in a dielectric solvent, preferably a fluorinated solvent. The filled cells are individually sealed with a polymeric sealing layer, preferably formed from a composition comprising a material selected from the group consisting of thermoplastics, thermosets and precursors thereof.

The microcup structure enables a format flexible and efficient roll-to-roll continuous manufacturing process for the EPDs. The displays can be prepared on a continuous web of a conductor film such as ITO/PET by, for example, (1) coating a radiation curable composition onto the ITO/PET film, (2) forming the microcup structure by a microembossing or photolithographic method, (3) filling the microcups with an electrophoretic fluid and sealing the microcups, (4) laminating the sealed microcups with the other conductor film and (5) slicing and cutting the display into a desirable size or format for assembling.

One advantage of this EPD design is that the microcup walls are in fact built-in spacers to keep the top and bottom substrates apart at a fixed distance. The mechanical properties and structural integrity of this type of displays are significantly better than other displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive, which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut into almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired sizes. The isolated microcup or cell structure is particularly important when cells are filled with fluids of different specific properties such as colors and switching rates. Without the microcup structure, it will be very difficult to prevent the fluids in adjacent areas from intermixing or being subject to crosstalk during operation.

For applications to be viewed in dark environments, the microcup structure effectively allows the backlight to reach the viewer through the microcup walls. Unlike traditional EPDs, even a low intensity backlight is sufficient for users to view in the dark the transflective EPDs based on the microcup technology. A dyed or pigmented microcup wall may be used to enhance the contrast ratio and optimize the intensity of backlight transmitted through the microcup EPDs. A photocell sensor to modulate the backlight intensity might also be used to further reduce the power consumption of such EPDs.

The microcup EPDs may have the traditional up/down switching mode, the in-plane switching mode or the dual switching mode. In the display having the traditional up/down switching mode or the dual switching mode, there are a top transparent electrode plate, a bottom electrode plate and a plurality of isolated cells enclosed between the two electrode plates. In the display having the in-plane switching mode, the cells are sandwiched between a top transparent insulator layer and a bottom electrode plate.

The electrophoretic dispersions may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, and 3,668,106. See also *IEEE Trans. Electron Devices*, ED-24, 827 (1977), and *J. Appl. Phys.* 49(9), 4820 (1978).

The charged primary color particles are usually white and may be organic or inorganic pigments, such as $TiO_2$. The particles may also be colored. The particles should have acceptable optical characteristics, should not be swollen or softened by the dielectric solvent and should be chemically stable.

Suitable charged pigment dispersions may be manufactured by grinding, milling, attriting, microfluidizing and ultrasonic techniques. For example, pigment particles in the form of a fine powder may be added to a suitable dielectric solvent and the resulting mixture is ball milled or attrited for several hours to break up the highly agglomerated dry pigment powder into primary particles.

U.S. Pat. No. 4,285,801, issued to A. Chiang, discloses a stable suspension for use in EPDs which suspension has high electrophoretic sensitivity. The high sensitivity was achieved by adsorbing highly fluorinated polymers onto the surface of the suspended pigment particles. It was determined that the fluorinated polymer shells were excellent dispersants as well as highly effective charge control agents. However, the adsorbed fluorinated polymer shell may become separated from the pigment particles during the operation of the display, causing destabilization of the pigment particles. Moreover, a common problem associated with this type of electrophoretic dispersions is sedimentation or creaming of the pigment particles particularly when high density pigment particles are used.

One method for achieving gravitational stability against sedimentation or creaming is to carefully select pigment and suspending liquid having similar or same specific gravities. However, when a dense inorganic pigment such as $TiO_2$ (specific gravity ~4) is employed, it is very difficult to find an organic solvent to match its density. This problem may be eliminated or alleviated by microencapsulating or coating the particles with a suitable polymer to match the specific gravity to that of the dielectric solvent.

Stabilization of pigment particles for use in EPDs has been effected by covalently bonding the pigment to a polymeric stabilizer. U.S. Pat. No. 5,914,806 discloses that charged pigment particles are substantially stabilized against agglomeration using polymeric stabilizers covalently bonded to the particle surface. The particles are organic pigments and the stabilizers are polymers with functional end groups capable of forming covalent bonds with the complementary functional groups of the organic pigment on the surface. Since only a thin layer of polymer is coated onto the pigment particles, it is very difficult, if not impossible, to match the specific gravity of dense particles, such as $TiO_2$, to that of most commonly used organic solvents, by using this method.

Microencapsulation of the pigment particles may be accomplished either chemically or physically. Typical microencapsulation processes include interfacial polymerization, in-situ polymerization, phase separation, coacervation, electrostatic coating, spray drying, fluidized bed coating and solvent evaporation. Well-known procedures for microencapsulation have been disclosed in Kondo, Microcapsule Processing and Technology, Microencapsulation, Processes and Applications, (I.E. Vandegaer, ed.), Plenum Press, New York, N.Y. (1974), and Gutcho, Microcapsules and Microencapsulation Techniques, Nuyes Data Corp., Park Ridge, N.J. (1976), both of which are hereby incorporated by reference.

A process involving (1) dispersing pigment particles in a non-aqueous polymer solution, (2) emulsifying the dispersion in an aqueous solution containing surfactants, (3) removing the organic solvent and (4) separating the encapsulated particles, was disclosed in U.S. Pat. No. 4,891,245 for the preparation of specific gravity matched particles for use in EPD applications. However, the use of an aqueous solution in the process results in major problems such as flocculation caused by separation of the particles from water and undesirable environmental sensitivity of the display.

U.S. Pat. No. 4,298,448, issued to K. Muller and A. Zimmerman, discloses the application of particles of various pigments where the particles are coated with an organic material which is stable at the cell operating temperature but melts at higher temperatures. The organic coating material contains a charge control agent to impart a uniform surface potential which permits the particles to migrate in a controlled fashion.

Microencapsulation of pigment particles by interfacial polymerization/crosslinking can result in a highly crosslinked microcapsule that does not melt at an elevated temperature. If necessary, microcapsules may be post hardened by in-situ polymerization crosslinking reactions inside the microcapsules. However, typical dielectric solvents useful for EPD applications have a relatively low refractive index compared to most of crosslinked polymers. As a result, specific gravity matched pigment microcapsules having a thick layer of polymeric shell or matrix typically show a lower hiding power or lower light scattering efficiency than the non-capsulated pigment particles.

Therefore, there still exists a need for pigment particles with optimal characteristics for application in all type of EPDs, including traditional EPDs, microcup EPDs as well as encapsulated EPDs. Desirable particle characteristics include uniform size, surface charge, high electrophoretic mobility, stability against agglomeration, better shelf life stability, matching specific gravity with various dispersion fluids, better hiding power, lower Dmin, higher contrast ratio and other particle characteristics which provide for a wider latitude in the control of switching rate.

SUMMARY OF THE INVENTION

The first aspect of the invention relates to pigment particles with the above cited desirable characteristics for various EPD applications. The particles have a core coated with a layer of shell. The shell preferably has a high refractive index whereas the core preferably has a low specific gravity and a low refractive index. The core-shell particles provide a high scattering efficiency and/or high hiding power. The hiding power is also less sensitive to the particle size distribution. Furthermore, a high contrast ratio can be achieved with a low concentration of core-shell particles of this invention in the electrophoretic suspension. Consequently, EPDs using the dispersed core-shell particles as the pigment particles exhibit a high % reflectance in the Dmin area and an improved contrast ratio. Moreover, the viscosity of the electrophoretic fluid can be significantly reduced and switching rate can be improved without compromising the contrast ratio and reflectance in the Dmin area.

The second aspect of the invention relates to the preparation of the core-shell particles.

The third aspect of the invention relates to an electrophoretic dispersion comprising the core-shell pigment particles of the invention and optionally a charge controlling agent.

The fourth aspect of the invention relates to microencapsulation of the core-shell pigment particles of the invention involving the use of a reactive protective colloid.

The fifth aspect of the invention relates to an electrophoretic display in which the display cells are filled with an electrophoretic dispersion of the present invention.

DETAILED DESCRIPTION OF THE INVENTION

All publications, patent applications and patents cited in this specification are incorporated by reference in this application as if each individual publication, patent application or patent were specifically and individually indicated to be incorporated by reference.

Definitions:

Unless defined otherwise in this specification, all technical terms are used herein according to their conventional definitions as they are commonly used and understood by those of ordinary skill in the art.

The term "refractive index" is the ratio of the speed of radiation (as light) in one medium (as a vacuum) to that in another medium.

The term "contrast ratio" refers to the ratio of the maximum to minimum luminance values in a display.

The term "Dmax" represents maximum image density, and is equal to the maximum optical density available.

The term "Dmin" refers to the minimum optical density of a non-image area.

The term "core-shell pigment particles" refers to the pigment particles of the present invention in which a core (i.e., the center of a core-shell particle) is coated with a layer of shell. The term "particle core" refers to the center of a core-shell particle.

The Core-Shell Particles

The invention relates to pigment particles with the above cited desirable characteristics for various EPD applications. The particles have a core coated with a layer of shell. By varying the core/shell weight ratio, the specific gravity of the core-shell particles may be matched to that of the dielectric solvent in which the particles are suspended.

The shell preferably has a high refractive index whereas the core preferably has a low specific gravity and a low refractive index.

In addition, when there is a significant difference between the refractive index of the core and that of the shell and also a significant difference between the refractive index of the shell and that of the dielectric solvent used in the electrophoretic suspension, the resulting core-shell particles provide a high scattering efficiency and/or high hiding power. The hiding power is also less sensitive to the particle size distribution. Furthermore, a high contrast ratio can be achieved with a low concentration of core-shell particles of this invention in the electrophoretic suspension. Consequently, EPDs using the dispersed core-shell particles as the pigment particles exhibit not only a low Dmin or a high % reflectance but also an improved contrast ratio. Moreover, the viscosity of the electrophoretic fluid can be significantly reduced and switching rate can be improved without compromising the contrast ratio and reflectance in the Dmin area.

In one embodiment of the present invention, the particle core is formed of a material having a refractive index lower than that of the shell, preferably the refractive index of the core is lower than that of the shell by least about 0.5, preferably by at least about 1.0. More specifically, the core particles of this invention may have a refractive index from about 1.0 (for air pocket or void) to about 2.0, preferably from about 1.0 to about 1.7 and more preferably from about 1.0 to about 1.5.

The specific gravity of the particle core may range from about 0 (for air pocket or void) to about 2.1, preferably from about 0.1 to about 1.8 and more preferably from about 0.5 to about 1.4.

TABLE I

Refractive Indices (R.I.) and Specific Gravities (s.g.) of Some Inorganic Powders and Polymeric Lattices

|  | R.I. | s.g. |
|---|---|---|
| $TiO_2$ rutile | 2.7 | 4.3 |
| $TiO_2$ anatase | 2.6 | 3.8 |
| ZnO | 2.0 | 5.5 |
| $Fe_2O_3$ | 3.0 | 5.2 |
| $Fe_3O_4$ | 2.4 | 5.1 |
| CaO | 1.8 | 3.3 |
| $CaCO_3$ | 1.8 | 2.8 |
| MgO | 1.7 | 3.2 |
| $ZrO_2$ | 1.9 | 5.0 |

TABLE I-continued

Refractive Indices (R.I.) and Specific Gravities (s.g.)
of Some Inorganic Powders and Polymeric Lattices

|  | R.I. | s.g. |
|---|---|---|
| $Al_2O_3$ | 1.8 | 4.0 |
| $GeO$—$GeO_2$ | 1.6 | 4–6 |
| $BaSO_4$ | 1.7 | 4.5 |
| $MgF_2$ | 1.4 | 3.2 |
| $SiO_2$ amorphous | 1.4 | 2.0 |
| Polystyrene | 1.6 | 1.05 |
| Polyacrylate | 1.5 | 1.00 |
| Polyurea | 1.6 | 1.10 |

Pure whiteners: $TiO_2$ or ZnO,
Fillers: $BaSO_4$, $ZnS/BaSO_4$, Talc, $CaCO_3$, $MgCO_3$, kaolin clay, etc.

The core may further comprise a light absorber or emitter such as a fluorescent or phosphorescent material.

The particle core may have a diameter ranging from about 0.1 to about 2.0 microns, preferably from about 0.2 to about 1.5 microns and more preferably from about 0.3 to about 1.2 microns. Preferred core particle size is dependent on the composition of the core material, the composition and thickness of the shell and the dielectric solvent used.

The particle core having a low specific gravity core may be formed from air pocket or void or may be in the form of a solid core formed from a material selected from the group consisting of polymers or composites thereof, inorganic, organic or organometallic compounds including inorganic hydroxides, oxides and mixtures thereof. Useful polymers and composites thereof and methods for manufacture of these composites have been disclosed in PCT International Patent Application No. WO 99/10767, which is incorporated herein by reference in its entirety. The term "solid core" refers to a core which is substantially devoid of any air pockets or voids.

Silica is one of the most preferred materials for the particle core because it is thermally and photochemically stable and is easy to manufacture. Typical procedures for the manufacture, use and purification of silica are disclosed in U.S. Pat. No. 5,248,556, which is incorporated herein by reference in its entirety. Alternatively, the silica particles may be prepared by hydrolysis of tetraethylorthosilicate in an aqueous alcohol according to the procedure described in J. Colloid Interface Sci. 26, 62, (1968), the content of which is incorporated herein by reference. The particle size of the silica is preferably in the range of 0.01-2.0 microns, preferably 0.2-1.5 microns and more preferably 0.3-1.0 microns. Commercially available silica dispersions may also be obtained from, for example, Nissan Chemical and Nalco Co. Other types of silica materials such as Min-u-sil quartz (from Truesdale Company, Bington, Mass.) or borosilicate glass (from Potters Industries, Carlstadt, N.J.) are also useful as the core material.

Polymeric latexes or dispersions are the other preferred materials for the particle core. Suitable latexes include, but are not limited to, carboxylated styrene acrylic dispersion such as Pliotec 7300 and 7104 (from Good Year), styrene acrylic dispersion with a low ion concentration, such as SCX-1550 and SCX 1915 (Johnson Polymer), acrylic dispersion (such as Flexbond 289 from Air products and chemicals), crosslinked PS-DVB beads, PMMA beads, self-crosslinking acrylic copolymer emulsion FREEREZ HBR and FREEREZ AAM (from BF Goodrich), self-crosslinking vinylacetate copolymer emulsion CRESTORESIN NV (from BF Goodrich), and carboxylated polyvinyl chloride-acrylic emulsion, self-curing nonionic stabilized polyvinyl chloride-acrylic emulsion Vycar 460X49 and the like. Since most inorganic oxide shell formation processes involve relatively high temperature reactions, thermally stable latexes are preferred. However, degradable and low ash-content polymers such as poly (methyl methacrylate), poly (methylstyrene) and copolymers thereof may be used when air pockets or voids are to be the core or part of the core in the final product.

The optical and chemical properties of the resultant core-shell particles may be improved significantly by appropriate surface treatment of the core particles. For example, the silica surface may be pretreated with a thin layer of aluminum hydrous oxide or aluminum silicate to improve the adhesion to the shell such as the $TiO_2$ shell.

The core particles such as the silica particles prepared according to U.S. Pat. No. 5,248,556 may be coated with a shell precursor such as titanium hydrous oxide which can later be converted to a $TiO_2$ shell by calcination at a high temperature. Magnesium fluoride or tin oxide may be used to pre-treat the core to improve the yield of the anatase $TiO_2 \rightarrow$rutile $TiO_2$ transformation during the subsequent calcination process.

To enhance the light scattering efficiency or hiding power of the core-shell particles in EPD applications, the shell of the present invention preferably is formed from a material of high refractive index, preferably greater than about 2 and more preferably greater than about 2.5. Suitable high index materials for the shell of the present invention include metal oxides such as oxides of Ti, Zn, Zr, Ba, Ca, Mg, Fe, Al or the like. $TiO_2$, particularly rutile $TiO_2$, is the most preferable one because of its superior whiteness and light fastness. Alternatively, metal carbonates or sulfates such as $CaCO_3$ and $BaSO_4$ may also be used as the shell or as an additive in the shell.

For core particles of from about 0.2 to about 1.5 microns in diameter, the average thickness of the shell is preferably from about 0.05 to about 1.2 microns, more preferably from about 0.1 to about 0.6 microns and most preferably from about 0.2 to about 0.5 microns.

The shell may be coated or deposited onto the core particles by various procedures known in the art. Non-limiting methods for the manufacture of core-shell particles include chemical processes such as microwave hydrothermal processing, forced hydrolysis and precipitation, double jet technique, dispersion technique, sol-gel processing, vapor phase deposition, phase separation, solvent evaporation and the like. For example, the $TiO_2$ shell may be prepared by the calcination process as described in U.S. Pat. No. 5,248,556. The high temperature calcination process often results in a highly rough shell surface with poor integrity and significant microporosity. The excessive microporosity of shell tends to result in a deteriorated Dmin or % of reflectance due to undesirable absorption of the dielectric solvent and dyes from the electrophoretic fluid. To alleviate these problems caused by the excessive surface porosity, the core-shell particles may be further microencapsulated or coated with a thin polymer layer as the barrier layer against the dye adsorption or absorption.

Alternatively, the shell may be prepared by the microwave hydrothermal process as described in Mater. Res. Bull., 27 (12), 1393-1405 (1992); J. Mater. Sci. Left, 14, 425-427 (1995); Novel Tech. Synth. Process, Adv. Mater., Proc. Symp., 103-17, edited by J. Singh and S. Copley (1994); and J. Mater. Sci., 26, 6309-6313 (1991). A pure rutile titania may be obtained directly from an aqueous titanium tetrachloride solution at 164° C./200 psi by the microwave hydrothermal process at 2.45 GHz for 2 hours. Since the processing temperature is relatively low, the microwave hydrothermal process tends to result in a shell of better integrity and less porosity than those prepared by the calcination process. Other crystalline metal oxide, such as zirconia, hematite or barium titania, may also be prepared by the microwave hydrothermal process.

The dielectric solvent used for the core-shell particles can be selected from various solvents with desirable characteristics, including specific gravity, dielectric constant, refractive index and relative solubility. A preferred suspending fluid has a low dielectric constant of from about 1.7 to about 10, a low refractive index no greater than about 1.7, preferably no greater than about 1.6 and a specific gravity which matches that of the core-shell particles. Suitable dielectric solvents include dodecylbenzene, diphenylethane, low molecular weight halogen containing polymers including poly(chlorotrifluoroethylene) (Halogenated Hydrocarbon Inc., River Edge, N.J.), Galden® HT and ZT oils (fluorinated polyethers from Ausimont, Morristown, N.J.) and Krytox® lubricant oils such as K-fluids (from Dupont, Wilmington, Del.).

The Core-Shell Particles With Charge Control Agent

To improve the switching performance of the core-shell particles in an EPD cell, the particles may further comprise a charge controlling agent. For example, when an electrophoretic dispersion in which a fluorinated solvent or solvent mixture is used as the suspending solvent and the charged core-shell pigment particles are the dispersed phase in the solvent or solvent mixture (i.e., the continuous phase), the charge of the core-shell pigment particles may be provided by a charge control agent comprising:

(i) a soluble fluorinated electron accepting or proton donating compound or polymer in the continuous phase and an electron donating or proton accepting compound or polymer in the dispersed phase, preferably on the surface of the core-shell particles; or (ii) a soluble fluorinated electron donating or proton accepting compound or polymer in the continuous phase and an electron accepting or proton donating compound or polymer in the dispersed phase, preferably on the surface of the core-shell particles.

This charge control system may be incorporated into the electrophoretic dispersion in a variety of ways. For example, a proton acceptor of (i) may be applied to the core-shell pigment particles and a soluble fluorinated proton donor of (i) may be added into the continuous phase. Similarly, a proton donor of (ii) may be applied to the core-shell pigment particles and a soluble fluorinated proton acceptor of (ii) may be added into the continuous phase.

Another alternative for the charge control system results from the presence of the required donor/acceptor components in the same molecule. For example, one part of a molecule can represent, and function as, the soluble fluorinated donor/acceptor and another part can represent, and function as, the complementary insoluble acceptor/donor. The presence of both the soluble fluorinated donor/acceptor and the complementary insoluble acceptor/donor in the same charge control agent molecule results in a high surface activity and a strong adsorption of the charge control agent onto the core-shell particles.

Each of the two agents, namely the proton acceptor and the soluble fluorinated proton donor of (i) or the proton donor and the soluble fluorinated proton acceptor of (ii), is present in the amount of from 0.05 to 30 weight % based on the core-shell pigment particles, preferably from 0.5 to 15 weight %, in the dispersion.

Examples of the suitable electron accepting or proton donating compounds or polymers in the dispersed phase or on the surface of the core-shell particles include alkyl, aryl, alkylaryl or arylalkyl carboxylic acids and their salts, alkyl, aryl, alkylaryl or arylalkyl sulfonic acids and their salts, tetra-alkylammonium and other alkylaryl ammonium salts, pyridinium salts and their alkyl, aryl, alkylaryl or arylalkyl derivatives, sulfonamides, perfluoroamides, alcohols, phenols, salicylic acids and their salts, acrylic acid, sulfoethyl methacrylate, styrene sulfonic acid, itaconic acid, maleic acid, hydrogen hexafluorophosphate, hydrogen hexafluoroantimonate, hydrogen tetrafluoroborate, hydrogen hexafluoroarsenate (V) and the like. The alkyl, alkylaryl, arylalkyl and aryl groups preferably have up to 30 carbon atoms. Organometallic compounds or complexes containing an electron deficient metal group such as tin, zinc, magnesium, copper, aluminum, cobalt, chromium, titanium, zirconium or derivatives and polymers thereof, may also be used. For the purpose of this invention, protonated polyvinylpyridine copolymers or their quaternary salts, copper or zirconium salts such as zirconium (tetraacetoacetate), zirconium acetoacetonate and copper acetoneacetonate are preferred.

Examples of the soluble, fluorinated, electron accepting or proton donating compounds or polymers in the continuous phase include fluorinated alkyl, aryl, alkylaryl or arylalkyl carboxylic acids, fluorinated alkyl, aryl, alkylaryl or arylalkyl sulfonic acids, fluorinated sulfonamides, fluorinated carboxamides, fluorinated alcohols, fluorinated ether alcohols, fluorinated phenols, fluorinated salicylic acids, hydrogen hexafluorophosphate, hydrogen hexafluoroantimonate, hydrogen tetrafluoroborate, hydrogen hexafluoroarsenate (V), fluorinated pyridinium salts or quarternary ammonium salts and the like. Fluorinated organometallic compounds or fluorinated complexes containing an electron deficient metal group such as tin, zinc, magnesium, copper, aluminum, chromium, cobalt, titanium, zirconium and derivatives and polymers thereof, may also be used. The perfluorocarboxylic acids and salts or complexes include DuPont poly(hexafluoropropylene oxide), carboxylic acids such as Krytox® 157 FSL, Krytox® 157 FSM, Krytox® 157 FSH, the Demnum series manufactured by Daikin Ind., Ausimont Fluorolink® C and 7004 and the like. Fluorinated organometallic compounds include fluorinated metal phthalocyanine dyes as prepared by the method disclosed in U.S. Pat. No. 3,281,426 (1966), and other fluorinated metal complexes such as zirconium perfluoroacetoacetonates and copper perfluoroacetoacetonate which may be prepared from hexafluoroacetylacetone and metal chloride. For example, copper perfluoroacetoacetonate may be prepared by mixing appropriate amounts of copper chloride, dry methanol and hexafluoroacetylacetone and allowing the mixture to react in a dry box at room temperature. After the rate of hydrogen chloride evolution slows down, the mixture is refluxed for ½ hour under nitrogen atmosphere. Copper perfluoroacetoacetonate as a colorless crystalline solid may then be obtained by filtration followed by vacuum sublimation at room temperature. Fluorinated quinolinol metal complexes are also very useful.

Preferred soluble fluorinated electron accepting or proton donating compounds include triflic acid, trifluoroacetic acid, perfluorobutyric acid, perfluorinated amides, perfluorinated sulfonamide, and the Krytox® FS series, such as Krytox® FSL, zirconium and copper tetra(perfluoroacetoacetonate), fluorinated quinolinol Al complexes and fluorinated metal (such as Cu, Zn, Mg, Zr, and Si) phthalocyanine dyes.

Examples of the electron donating or proton accepting compounds or polymers include amines, particularly tert-amines or tert-anilines, pyridines, guanidines, ureas, thioureas, imidazoles, tetraarylborates and the alkyl, aryl, alkylaryl or arylalkyl derivatives thereof. The alkyl, alkylaryl, arylalkyl and aryl groups preferably have up to 30 carbon atoms. Preferred compounds or polymers include copolymers of 2-vinyl pyridine, 4-vinyl pyridine or 2-N,N-dimethylaminoethyl acrylate or methacrylate with styrene, alkyl acrylates or alkyl methacrylates or aryl acrylate or methacrylate, such as poly(4-vinylpyridine-co-styrene), poly(4-vinlypyridine-co-methyl methacrylate) or poly(4-vinlypyridine-co-butyl methacrylate).

Examples of the soluble, fluorinated electron donating or proton accepting compounds or polymers in the continuous phase include fluorinated amines, particularly tert-amines or anilines, fluorinated pyridines, fluorinated alkyl or aryl guanidines, fluorinated ureas, fluorinated thioureas, fluorinated tetraarylborates, and derivatives and polymers thereof. The fluorinated amines may be derivatives of a perfluoropolyether, such as a precondensate of a multifunctional amine and a perfluoropolyether methyl ester.

Examples of compounds with donor/acceptor and fluorinated acceptor/donor combination include any of the previously mentioned compounds and derivatives and polymers thereof. The combination results in a zwitterionic type of charge control agent and has the advantages of improved performance and simpler composition with less individual components.

The details of the charge control system described above are disclosed in co-pending US patent application, U.S. Ser. No. 10/335,210 filed on Dec. 31, 2002, which is incorporated herein by reference in its entirety.

Microencapsulated Core-Shell Particles

If necessary, the core-shell particles may be microencapsulated or coated with a thin polymer layer to improve the optical and switching performances. For example, when a halogenated solvent, particularly a fluorinated, more particularly a perfluorinated solvent or a mixture thereof, or a mixture of a halogenated solvent and a non-halogenated solvent is used as the suspending solvent for the electrophoretic dispersion, the core-shell particles may be advantageously microencapsulated involving the use of certain reactive halogenated, particularly highly fluorinated, protective colloids having at least one reactive functional group. Typical reactive functional groups include amino, hydroxy, thiol, isocyanate, thioisocyanate, epoxide, aziridine, a short-chain alkoxysilyl such as trimethoxy silyl, a carboxylic acid derivative such as acid anhydride or acid chloride, chloroformate and other reactive functional groups capable of undergoing interfacial polymerization/crosslinking. Protective colloids having more than one reactive functional group are particularly useful.

The preparation of the microcapsules with the core-shell pigment particles dispersed therein is accomplished by interfacial polymerization/crosslinking reactions which may be followed by solvent evaporation and/or in-situ radical, ring opening or condensation polymerization/crosslinking reactions to harden the core (i.e., the core-shell pigment particle) of the microcapsules.

More specifically, the microcapsules may be prepared by dispersing an internal phase (or dispersed phase) in a continuous phase (or external phase). The internal phase comprises the core-shell pigment particles dispersed in a mixture of reactive monomers or oligomers and optionally a solvent, whereas the continuous phase comprises a reactive protective colloid and a non-solvent for the internal phase. To form the microcapsules having the core-shell pigment particles dispersed therein, the internal phase pigment dispersion is emulsified into the continuous phase. A hard shell is formed around the internal dispersion phase as a result of the interfacial polymerization/crosslinking between the reactive monomer or oligomer from the internal phase and the reactive protective colloid from the continuous phase. The resultant microcapsules may be further hardened by solvent evaporation or in-situ polymerization/crosslinking.

Suitable reactive protective colloids generally comprise one or more halogenated, preferably fluorinated, moiety that is soluble in the continuous phase of the dispersion to provide sufficient steric stabilization of the internal phase, and at the same time, bear one or more reactive functional groups as described above that are amenable to interfacial polymerization/crosslinking with appropriate complementary reactants from the internal phase.

The reactive protective colloids may be prepared by, for example, linking molecules containing desirable functional groups for interfacial polymerization/crosslinking, with a low molecular weight compound, polymer or oligomer comprising a halogenated, preferably fluorinated, main chain or side chain. The low molecular weight compounds include, but not limited to, alkanes, aromatic compounds and arenes.

More specifically, the reactive protective colloids may be represented by Formula (I) below:

$$R\text{-}[Q\text{-}L\text{-}A)_m]_n \quad\quad (I)$$

wherein:

m and n are independently natural numbers which are $\geq 1$, preferably from 1 to 10, more preferably from 2 to 6;

Q and L together forming a linking chain for linking the main chain (R) to the reactive functional group(s) A;

A is a reactive functional group; and

R is a low molecular weight, polymeric or oligomeric chain, preferably selected from a group consisting of alkyl, aryl or alkylaryl and polymeric or oligomeric chains and halogenated, particularly fluorinated, derivatives thereof.

The reactive functional group may be amino, hydroxy, thiol, isocyanate, thioisocyanate, epoxide, aziridine, a short-chain alkoxysilyl such as trimethoxy silyl, a carboxylic acid derivative such as acid anhydride or acid chloride, chloroformate or other reactive functional groups capable of undergoing interfacial polymerization/crosslinking.

In one of the preferred embodiments, the R in Formula (I) may be represented by the Formula (II) below:

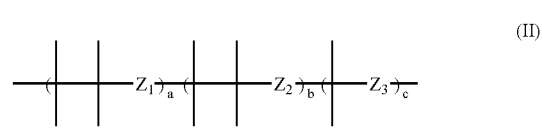

$$\left(\!\!\begin{array}{c}|\\-C-\\|\end{array}\!\!-Z_1\!\right)_a\!\!\left(\!\!\begin{array}{c}|\\-C-\\|\end{array}\!\!-Z_2\!\right)_b\!\!\left(\!\!\begin{array}{c}|\\-C-\\|\end{array}\!\!-Z_3\!\right)_c \quad (II)$$

wherein the open substituent positions (not designated) on the main chain of Formula (II) can be the same or different and may independently be selected from the group consisting of hydrogen, halogen (especially fluoro), alkyl, aryl, alkylaryl, fluoroalkyl, fluoroaryl, fluoroalkylaryl, —$OR^1$, —$OCOR^1$, —$COOR^1$, —$CONR^1R^2$ (wherein $R^1$ and $R^2$ are independently hydrogen, alkyl, aryl, alkylaryl, fluoroalkyl, fluoroaryl, fluoroalkylaryl or fluorinated polyether) and substituted derivatives thereof;

$Z_1$, $Z_2$, and $Z_3$ are independently oxygen or absent;

a, b and c are the weight fractions of the corresponding repeating units and are independently in the range of 0-1 with their sum no greater than 1.

The alkyl group referred to in Formula (II) preferably has 1-20 carbon atoms and the aryl group preferably has 6-18 carbon atoms.

In the case of Formula (I) wherein n is 1, one of the open substituent positions on the main chain of Formula (II), preferably at one of the two end positions, is substituted with -Q-L-(A)$_m$ and the remaining positions have substituents which may be the same or different, independently selected from the group identified above. In the case of Formula (I) wherein n is greater than 1, more than one of the open substituent positions on the main chain of Formula (II) are substituted with -Q-L-(A)$_m$ and the remaining positions have substituents which may be the same or different, independently selected from the group identified above.

The polymeric or oligomeric chain in Formula (II) may be a homopolymer (i.e., Formula II wherein b and c are 0), a random copolymer (i.e., Formula II wherein the repeating units are arranged randomly), a block copolymer (i.e., Formula II wherein the repeating units are arranged in a particular sequence) or a grafted or comb type of copolymer.

The linking chain, -Q-L-, in Formula (I) is a chain comprising a linking moiety (Q). The linking group L connecting to the reactive functional group A is defined in the broadest sense. The linking moiety (Q) in the linking chain, -Q-L-, connects to the low molecular weight, polymer or oligomer chain R. In the context of the present invention, the linking moiety may be ether (—O—), thioether (—S—), amide (—CONR$^3$—), imide [(—CO)$_2$N—], urea (—R$^3$NCONR$^4$—), thiourea (—R$^3$NCSNR$^4$—), urethane (—OCONR$^3$—), thiourethane (—OCSNR$^3$—), ester (—COO—), carbonate (—OCOO—), imine (=N—), amine (—NR$^3$—) and the like wherein R$^3$ and R$^4$ are independently hydrogen, alkyl, aryl, alkylaryl, polyether and derivatives thereof, particularly halogenated derivatives such as fluoroalkyl, fluoroaryl, fluoroalkylaryl or fluorinated polyether. R$^3$ or R$^4$ preferably has 0-100 carbon atoms, more preferably 0-20 carbon atoms.

Alternatively, the reactive protective colloids of the present invention may be prepared by using a polymer or oligomer comprising a halogenated, preferably fluorinated, side chain. In this class, the reactive protective colloids of the invention may be represented by the Formula (III) below:

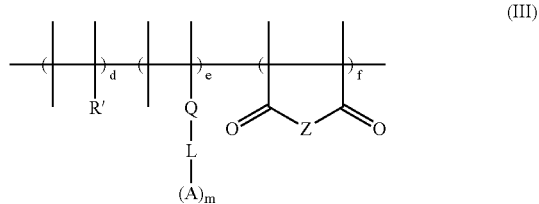

(III)

wherein Q, L, A, m and the open substituent positions (not designated) on the main chain are as defined in Formula (I), and R' is hydrogen, halogen (especially fluoro), alkyl, aryl, alkylaryl, fluoroalkyl, fluoroaryl, fluoroalkylaryl, —OR$^1$, —OCOR$^1$, —COOR$^1$, —CONR$^1$R$^2$ (wherein R$^1$ and R$^2$ are independently hydrogen, alkyl, aryl, alkylaryl, fluoroalkyl, fluoroaryl, fluoroalkylaryl or fluorinated polyether) and substituted derivatives thereof;

Z is oxygen, NR$^5$ or N-L-(A)$_m$ in which L, A and m are as defined in Formula (I) and R$^5$ is hydrogen, alkyl, aryl, alkylaryl, fluoroalkyl, fluoroaryl, fluoroalkylaryl, —COOR$^1$, —CONR$^1$R$^2$ (wherein R$^1$ and R$^2$ are independently hydrogen, alkyl, aryl, alkylaryl, fluoroalkyl, fluoroaryl, fluoroalkylaryl or fluorinated polyether) and substituted derivatives thereof;

d, e and f are the weight fractions of the corresponding repeating units with the sum thereof no greater than 1. More specifically, d is in the range of 0.2-0.995, preferably 0.5-0.95; e is in the range of 0.005-0.8, preferably 0.01-0.5; and f is in the range of 0-0.8, preferably 0.001-0.2.

When a fluorinated polyether solvent is used as the dielectric solvent, a fluoropolyether functionalized by a reactive group such as an amino or an isocyanate is the preferred reactive protective colloid. The colloids having more than one reactive functional group are even more preferred. In one embodiment, the most preferred reactive protective colloid has a fluoropolyether chain (R) with at least 2 amino (primary or secondary) or isocyanate (—NCO) groups. The most preferred arrangement of the amino and isocyanate functional groups is that they are concentrated near one end of the linking chain, opposite from the fluorinated R group to maximize the surface activity and the neighboring group effect to speed up the interfacial polymerization/crosslinking reactions. This may reduce undesirable desorption and diffusion of the reactive protective colloid back into the continuous phase after the first amino or isocyanate group reacts at the particle interface with the complementary reactive groups from the internal phase (dispersed phase). Protective colloids having only one reactive functional group for interfacial polymerization/crosslinking may tend to desorb from the particles and diffuse back into the continuous phase after reaction at the particle interface with the complementary reactive monomer or oligomer in the internal phase. As a result, microencapsulation using protective colloids having only one reactive functional group tends to produce capsules with a broad distribution of pigment content inside the capsules and a broad distribution of specific gravity of the capsules. This in turn results in a poor shelf life and switching performance of the EPD devices.

Another preferred embodiment is reactive protective colloids having a fluoropolyether chain (R) with a linking chain (-Q-L) wherein the linking moiety Q is an ether, amide, urea or urethane.

Another embodiment of the invention is reactive protective colloids of Formula (I) wherein R is Formula (II), Q is ether, amide, urea or urethane, L is a straight or branched hydrocarbon chain optionally interrupted by a heteroatom or a straight or branched hydrocarbon chain substituted by an optionally substituted heterocyclic moiety, A is an amino or isocyanate group, m is $\geq 2$ and n is 1.

The reactive protective colloids of Formula I may be prepared by conventional means, such as connecting the main chain R to the functional group(s) via the formation of a linking chain comprising a linking moiety (O). For example, an amide linking moiety may be formed by reacting an ester group with an amino group, and a urethane linking moiety may be formed by reacting a primary alcohol group with a isocyanate group under reaction conditions known in the art. Other linking moieties may also be formed by conventional methods. The ether or thioether linking moiety, for example, may be formed by reaction between an alcohol or thiol group with halogen. The imide linking moiety may be formed, for example, by reacting a succinic acid diester or an o-phthalic acid diester with a primary amine. The urea or thiourea group may be formed by reaction between an isocyanate or isothiocyanate with a primary or secondary amine. The amine linking group, for example, may be formed by reaction between an amine and a halide or a tosylated alcohol. The ester linking groups may be formed by reaction between a carboxyl group and an alcohol group. The above list clearly is not exhaustive. Other useful synthetic schemes are readily available in general organic chemistry textbooks. The reaction conditions for forming these linking moieties are also well known in the art. Detailed discussions are omitted here in the interest of brevity.

The reactive protective colloids of Formula (III) may be prepared by, for example, random copolymerization of fluorinated monomers such as perfluoroacrylates, tetrafluoroethylene or vinylidene fluoride with functional monomers such as isocyanatoethyl acrylate, isocyanatostyrene, hydroxyethyl methacrylate, glycidyl acrylate or maleic anhydride, followed by derivatization with multifunctional amines, thiols, alcohols, acids, isocyanates or epoxides.

In the process of microencapsulating the core-shell pigment particles, the complementary reactive group of the reactive monomer or oligomer in the dispersed phase is determined by the choice of the functional group in the reactive protective colloid in continuous phase and vice-versa. Typical pairs of reactive groups are amine/isocyanate, amine/thioisocyanate, amine/acid chloride or anhydride, amine/chloroformate, amine/epoxide, alcohol/isocyanate, alcohol/thioisocyanate, thiol/isocyanate, thiol/thioisocyanate, carbodiimide/epoxide and alcohol/siloxane.

Further details of the microencapsulation process involving the use of reactive protective colloids are described in co-pending US patent application, U.S. Ser. No. 10/335,051 filed on Dec. 31, 2002, which is incorporated herein by reference in its entirety.

EXAMPLES

The following examples are given to enable those skilled in the art to more clearly understand and to practice the present invention. They should not be considered as limiting the scope of the invention, but merely as being illustrative and representative thereof.

Example 1

5 Gm of PMMA beads (mean particle size=1.3 microns, from H.W. Sands Corp., Jupiter, Fla.) were dispersed with a homogenizer into 500 gm of an aqueous solution containing 0.3 M hydrochloride, 0.27 M of $TiCl_4$, 0.025 Gm of sodium dodecyl sulfate and 0.25 gm of polyvinylpyrrolidone (MW 10,000 from Aldrich). The dispersion was transferred to a pressurized microwave-transparent Pyrex flask and allowed to react at about 180° C. for 40 minutes with gentle stirring at 2.45 GHz frequency in a microwave oven equipped with two 900 W magnetrons. The product was filtered and washed with methanol several times and then dried in a vacuum oven. The specific gravity was estimated to be about 2.1 with a uniform layer of rutile titania on the PMMA beads. 5 Parts of the resultant core (PMMA)-shell (titania) particles were dispersed with a homogenizer into 10 parts of a 5% methanol solution of a copolymer of 4-vinylpyridine (90%) and butyl methacrylate (10%) (PVPy-BMA) (from Aldrich), spray-dried and re-dispersed into a solution containing 90.6 parts of perfluoropolyether HT-200 and 0.91 parts of Krytox 157FSL (Dupont). The resultant EPD dispersion showed good contrast ratio and switching rates as measured between two ITO plates with a 35 µm spacer.

Example 2

The procedure of Example 1 was repeated except that the resultant titania/PMMA particles were heated to 400° C. at a heating rate of 2° C./min to degrade the PMMA and form voids in the core. The resultant EPD dispersion showed an improved contrast ratio and switching rates as measured between two ITO plates with a 35 µm spacer.

Example 3

10 Gm of silica particles SP-1B (mean particle size=1 µm, from Fuso Chemical Co., Osaka, Japan) are dispersed in 500 gm of an aqueous 0.35 M hydrochloride solution containing 0.28 M of $TiCl_4$ and 0.2 gm of polyvinylpyrrolidone (MW 10,000 from Aldrich). The dispersion is homogenized at 7,000 RPM for 3 minutes, transferred to a pressurized microwave-transparent Pyrex flask and heated to 200° C. with gentle stirring for 1 hour at 2.45 GHz frequency in a microwave oven equipped with two 900 W magnetrons, filtered and washed with methanol several times then dried in a vacuum oven. The estimated core-shell ratio is about 15% corresponding to a shell thickness of 0.15 micron. The specific gravity is estimated to be about 2.6 with a uniform layer of rutile titania on the silica core. 5 Parts of the resultant core (PMMA)-shell (titania) particles are dispersed with a homogenizer into 10 parts of a 5% methanol solution of a copolymer of 4-vinylpyridine (90%) and butyl methacrylate (10%) (PVPy-BMA) (from Aldrich), spray-dried and re-dispersed into a solution containing 90.6 parts of perfluoropolyether HT-200 and 0.91 parts of Krytox 157FSL (Dupont). The resultant EPD dispersion can show good contrast ratio and switching rates as measured between two ITO plates with a 35 µm spacer.

Example 4

10 Gm of silica particles SP-1B are dispersed in 500 gm of an aqueous solution containing 0.25 gm of polyvinylpyrrolidone (MW 10,000 from Aldrich). 35 Gm of $TiOSO_4$ (from Aldrich) are dissolved in 100 gm of an 1M sulfuric acid solution, filtered and slowly added into the silica dispersion at 90° C. The reaction product is filtered, washed several times with methanol and DI water, dried and then calcined in a furnace at 850° C. for 45 min. The specific gravity of the resultant particle is estimated to be 2.6 with a discontinuous shell of titania coated on silica core as observed under transmission electron microscope. 5 Parts of the resultant core (PMMA)-shell (titania) particles are dispersed with a homogenizer into 10 parts of a 5% methanol solution of a copolymer of 4-vinylpyridine (90%) and butyl methacrylate (10%) (PVPy-BMA) (from Aldrich), spray-dried and re-dispersed into a solution containing 90.6 parts of perfluoropolyether HT-200 and 0.91 parts of Krytox 157FSL (Dupont). The resultant EPD dispersion can show acceptable contrast ratio as measured between two ITO plates with a 35 µm spacer.

While particular forms of the invention have been illustrated and described, it will be apparent that various modifications can be made without departing from the spirit and scope of the invention. Accordingly, it is not intended that the invention be limited, except as by the appended claims.

What is claimed is:

1. An electrophoretic dispersion comprising core-shell pigment particles dispersed in a dielectric solvent, wherein said core-shell pigment particle comprises a core having a low refractive index and a shell layer having a high refractive index; the refractive index of the shell layer is different from the refractive index of said dielectric solvent.

2. The electrophoretic dispersion of claim 1 wherein said core has a refractive index lower than the refractive index of said shell layer.

3. An electrophoretic display wherein display cells are filled with the electrophoretic dispersion of claim 1.

4. The electrophoretic dispersion of claim 1 wherein said core is formed from a material having a refractive index in the range of 1.0-2.0.

5. The electrophoretic dispersion of claim 4 wherein said core is formed from a material having a refractive index in the range of 1.0-1.7.

6. The electrophoretic dispersion of claim 5 wherein said core is formed from a material having a refractive index in the range of 1.0-1.5.

7. The electrophoretic dispersion of claim 1 wherein said core is formed from a material having a specific gravity in the range of 0-2.1.

8. The electrophoretic dispersion of claim 7 wherein said core is formed from a material having a specific gravity in the range of 0.1-1.8.

9. The electrophoretic dispersion of claim 8 wherein said core is formed from a material having a specific gravity in the range of 0.5-1.4.

10. The electrophoretic dispersion of claim 1 wherein said core has a diameter in the range of 0.1 to 2.0 microns.

11. The electrophoretic dispersion of claim 10 wherein said core has a diameter in the range of 0.2 to 1.5 microns.

12. The electrophoretic dispersion of claim 11 wherein said core has a diameter in the range of 0.3 to 1.2 microns.

13. The electrophoretic dispersion of claim 1 wherein said shell layer has a refractive index greater than 2.

14. The electrophoretic dispersion of claim 13 wherein said shell layer has a refractive index greater than 2.5.

15. The electrophoretic dispersion of claim 1 wherein said shell layer has a thickness in the range of 0.05 to 1.2 microns.

16. The electrophoretic dispersion of claim 15 wherein said shell layer has a thickness in the range of 0.1 to 0.6 microns.

17. The electrophoretic dispersion of claim 16 wherein said shell layer has a thickness in the range of 0.2 to 0.5 microns.

18. The electrophoretic dispersion of claim 1 wherein said core has a specific gravity lower than the specific gravity of said shell layer.

19. The electrophoretic dispersion of claim 1 wherein the difference between the refractive index of the core and the refractive index of the shell layer is at least 0.5.

20. The electrophoretic dispersion of claim 19 wherein the difference between the refractive index of the core and the refractive index of the shell layer is at least 1.0.

21. The electrophoretic dispersion of claim 1 wherein said core further comprises a light absorbing or emitting material.

22. The electrophoretic dispersion of claim 1 wherein said core is formed from a polymer or silica.

23. The electrophoretic dispersion of claim 1 wherein said shell layer is formed from an inorganic material.

24. The electrophoretic dispersion of claim 23 wherein said shell layer is formed from a material selected from the group consisting of oxides, carbonates and sulfates of Ti, Zn, Zr, Ba, Ca, Mg, Fe and Al.

25. The electrophoretic dispersion of claim 24 wherein said shell layer is formed from $TiO_2$ or ZnO.

26. The electrophoretic dispersion of claim 25 wherein said shell layer is formed from rutile $TiO_2$.

27. The electrophoretic dispersion of claim 1 wherein the dielectric solvent has a specific gravity substantially the same as the specific gravity of the core-shell pigment particles.

28. The electrophoretic dispersion of claim 1 wherein said core is formed from a material selected from selected from the group consisting of polymers and composites thereof, and inorganic, organic or organometallic compounds and mixtures thereof.

29. The electrophoretic dispersion of claim 1 wherein said core is a solid core.

30. An electrophoretic dispersion comprising a fluorinated solvent as a continuous phase, core-shell pigment particles as a dispersed phase and a charge controlling agent, wherein the core-shell pigment particle comprises a core having a low refractive index and a shell layer having a high refractive index, the core-shell pigment particles are charged and the charge is provided by the charge controlling agent comprising:
  (i) a soluble fluorinated electron accepting or proton donating compound or polymer in the continuous phase and an electron donating or proton accepting compound or polymer in the dispersed phase; or
  (ii) a soluble fluorinated electron donating or proton accepting compound or polymer in the continuous phase and an electron accepting or proton donating compound or polymer in the dispersed phase.

31. The electrophoretic dispersion of claim 30 wherein said core is a solid core.

32. An electrophoretic dispersion comprising core-shell pigment particles wherein said core-shell pigment particle comprises a core having a low refractive index and a shell layer having a high refractive index; said core-shell pigment particles are microencapsulated using a reactive protective colloid of Formula (I) or (III):

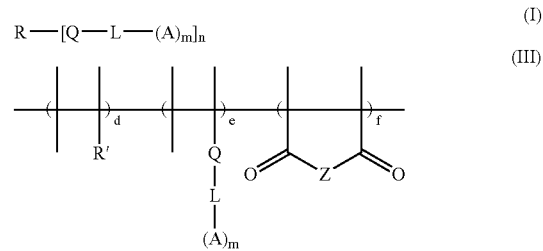

wherein:
m and n are independently natural numbers which are $\geq 1$;
Q and L together is a linking chain;
A is a reactive functional group; and
R is a low molecular weight, polymeric or oligomeric chain;
the open substituent positions on the main chain of Formula (III) are independently selected from the group consisting of hydrogen, halogen, alkyl, aryl, alkylaryl, fluoroalkyl, fluoroaryl, fluoroalkylaryl, —$OR^1$, —$OCOR^1$, —$COOR^1$, —$CONR^1R^2$ and substituted derivatives thereof wherein $R^1$ and $R^2$ are independently hydrogen, alkyl, aryl, alkylaryl, fluoroalkyl, fluoroaryl, fluoroalkylaryl or fluorinated polyether and R' is selected from the group consisting of hydrogen, halogen, alkyl, aryl, alkylaryl, fluoroalkyl, fluoroaryl, fluoroalkylaryl, —OR$^1$, OCOR$^1$, —COOR$^1$, —CONR$^1$R$^2$ and substituted derivatives thereof wherein R$^1$ and R$^2$ are independently hydrogen, alkyl, aryl, alkylaryl, fluoroalkyl, fluoroaryl, fluoroalkylaryl or fluorinated polyether;

Z is oxygen, NR$^5$, or N-L-(A)$_m$ in which A and m are as defined above, L is a linking group and R$^5$ is selected from the group consisting of hydrogen, alkyl, aryl, alkylaryl, fluoroalkyl, fluoroaryl, fluoroalkylaryl, —COOR$^1$, —CONR$^1$R$^2$ and substituted derivatives thereof wherein R$^1$ and R$^2$ are independently hydrogen, alkyl, aryl, alkylaryl, fluoroalkyl, fluoroaryl, fluoroalkylaryl or fluorinated polyether; and d, e and f are the weight fractions of the corresponding repeating units with the sum thereof no greater than 1.

33. The electrophoretic dispersion of claim 32 wherein said reactive functional group is selected from the group consisting of amino, hydroxy, thiol, isocyanate, thioisocyanate, epoxide, aziridine, short-chain alkoxysilyl, carboxylic acid derivative, chloroformate and other reactive functional groups capable of undergoing interfacial polymerization/crosslinking.

34. The electrophoretic dispersion of claim 33 wherein said short-chain alkoxysilyl is trimethoxy silyl.

35. The electrophoretic dispersion of claim 33 wherein said carboxylic acid derivative is acid anhydride or acid chloride.

36. The electrophoretic dispersion of claim 32 wherein said reactive protective colloid is a compound of Formula (I) wherein R is Formula (II)

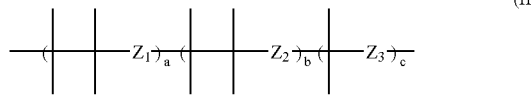

(II)

wherein the open substituent positions on the main chain of Formula (II) are independently selected from the group consisting of hydrogen, halogen, alkyl, aryl, alkylaryl, fluoroalkyl, fluoroaryl, fluoroalkylaryl, —OR$^1$, —OCOR$^1$, —COOR$^1$, —CONR$^1$R$^2$ and substituted derivatives thereof wherein R$^1$ and R$^2$ are independently hydrogen, alkyl, aryl, alkylaryl, fluoroalkyl, fluoroaryl, fluoroalkylaryl or fluorinated polyether; Z$_1$, Z$_2$, and Z$_3$ are independently oxygen or absent; and a, b and c are the weight fractions of the corresponding repeating units and are independently in the range of 0-1 with their sum no greater than 1, Q is ether, amide, urea or urethane, L is a straight or branched hydrocarbon chain optionally interrupted by a heteroatom or a straight or branched hydrocarbon chain substituted by an optionally substituted heterocyclic moiety, A is an amino or isocyanate group, m is ≧2 and n is 1.

37. The electrophoretic dispersion of claim 4 wherein said core is a solid core.

38. A microencapsulation process of making pigment microcapsules by interfacial polymerization/crosslinking reaction between:
(a) an internal phase which comprises core-shell pigment particles dispersed in a mixture of a reactive monomer or oligomer and optionally a solvent wherein said core-shell pigment particle comprises a core having a low refractive index and a shell layer having a high refractive index; and
(b) a continuous phase which comprises a reactive protective colloid of Formula (I) or (III):

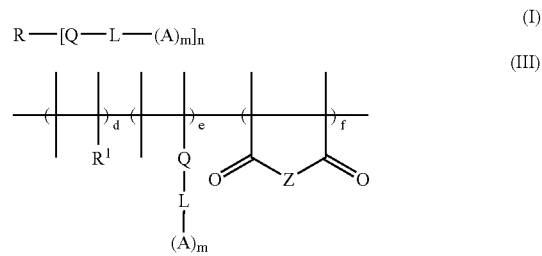

(I)

(III)

wherein:
m and n are independently natural numbers which are ≧1;
Q and L together is a linking chain;
A is a reactive functional group; and
R is a low molecular weight, a polymeric or oligomeric chain;
the open substituent positions on the main chain of Formula (III) are the same or different and may independently be selected from the group consisting of hydrogen, halogen, alkyl, aryl, alkylaryl, fluoroalkyl, fluoroaryl, fluoroalkylaryl, —OR$^1$, —OCOR$^1$, —COOR$^1$, —CONR$^1$R$^2$ and substituted derivatives thereof wherein R$^1$ and R$^2$ are independently hydrogen, alkyl, aryl, alkylaryl, fluoroalkyl, fluoroaryl, fluoroalkylaryl or fluorinated polyether and R$^1$ is selected from the group consisting of hydrogen, halogen, alkyl, aryl, alkylaryl, fluoroalkyl, fluoroaryl, fluoroalkylaryl, —OR$^1$, OCOR$^1$, —COOR$^1$, —CONR$^1$R$^2$ and substituted derivatives thereof wherein R$^1$ and R$^2$ are independently hydrogen, alkyl, aryl, alkylaryl, fluoroalkyl, fluoroaryl, fluoroalkylaryl or fluorinated polyether;

Z is oxygen, NR$^5$, or N-L-(A)$_m$ in which A and m are as defined above, L is a linking group and R$^5$ is selected from the group consisting of hydrogen, alkyl, aryl, alkylaryl, fluoroalkyl, fluoroaryl, fluoroalkylaryl, —COOR$^1$, —CONR$^1$R$^2$ and substituted derivatives thereof wherein R$^1$ and R$^2$ are independently hydrogen, alkyl, aryl, alkylaryl, fluoroalkyl, fluoroaryl, fluoroalkylaryl or fluorinated polyether; and d, e and f are the weight fractions of the corresponding repeating units with the sum thereof no greater than 1.

39. The microencapsulation process of claim 38 wherein said core is a solid core.

* * * * *